United States Patent [19]

Taira et al.

[11] 4,320,277
[45] Mar. 16, 1982

[54] THICK WELDED STEEL PIPE OF LARGE DIAMETER AND PRODUCTION THEREOF

[75] Inventors: Tadaaki Taira; Kiyoteru Hirabayashi; Hiroyuki Ichinose; Osamu Hirano, all of Fukuyama; Motoaki Suzuki, Yokohama, all of Japan

[73] Assignee: Nippon Kokan Kabushiki Kaisha, Tokyo, Japan

[21] Appl. No.: 124,559

[22] Filed: Feb. 25, 1980

[30] Foreign Application Priority Data

Feb. 23, 1979 [JP] Japan .................................. 54-19644

[51] Int. Cl.³ .......................... B23K 31/06; B23K 9/18
[52] U.S. Cl. ........................................ 219/61; 219/73
[58] Field of Search .................................. 219/61, 73

[56] References Cited

U.S. PATENT DOCUMENTS

| 4,038,514 | 7/1977 | Ashton ............................. 219/73 X |
| 4,071,732 | 1/1978 | Tanaka et al. .................... 219/74 X |
| 4,145,594 | 3/1979 | Koshiga et al. ..................... 219/61 |
| 4,186,864 | 2/1980 | Ishimaru et al. ................. 219/73 X |

FOREIGN PATENT DOCUMENTS

| 51-92750 | 8/1976 | Japan ................................. 219/73 |
| 52-03543 | 1/1977 | Japan ................................. 219/73 |
| 52-33849 | 3/1977 | Japan ................................. 219/73 |
| 53-130241 | 11/1978 | Japan . |
| 53-130242 | 11/1978 | Japan . |
| 54-10263 | 1/1979 | Japan ................................. 219/73 |

OTHER PUBLICATIONS

Metals Handbook, 8th Edition, vol. 6, "Welding and Brazing"; American Society for Metals, Ohio, 1971; pp. 148-151.

Primary Examiner—J. V. Truhe
Assistant Examiner—Keith E. George
Attorney, Agent, or Firm—Armstrong, Nikaido, Marmelstein & Kubovcik

[57] ABSTRACT

Circular pipe of large diameter progressively formed of flat stock, the pipe having a single longitudinal seam is seam-welded by preparing welding grooves such that the inner groove is smaller in size and angle than the outer groove, sequentially carrying out submerged arc welding on the inner welding groove, and large current MIG welding to then first layer of the outer welding edge and a submerged arc welding to a second layer thereof.

5 Claims, 10 Drawing Figures

FIG_2A
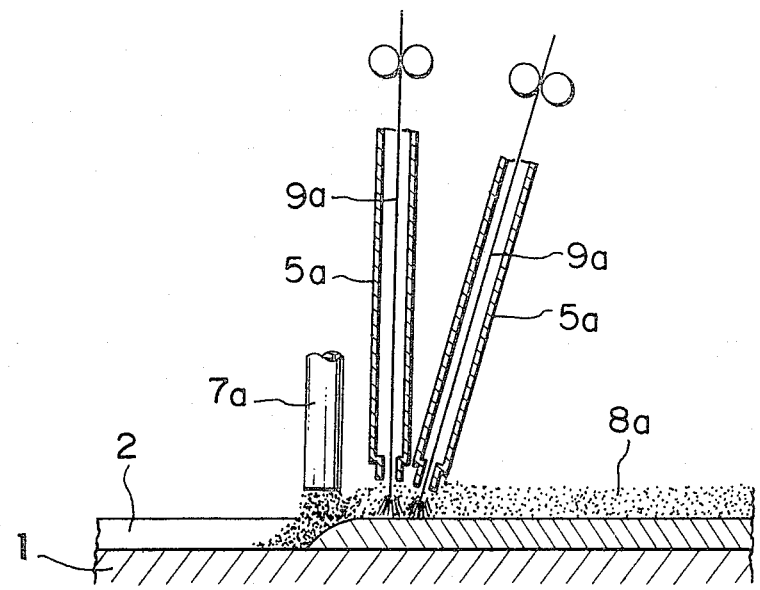
FIG_2B
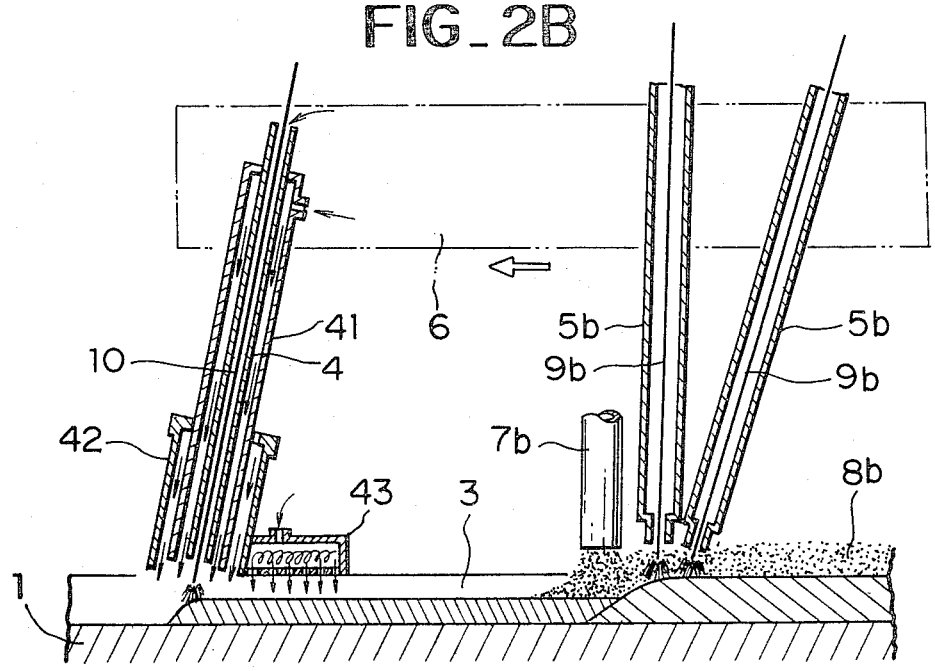

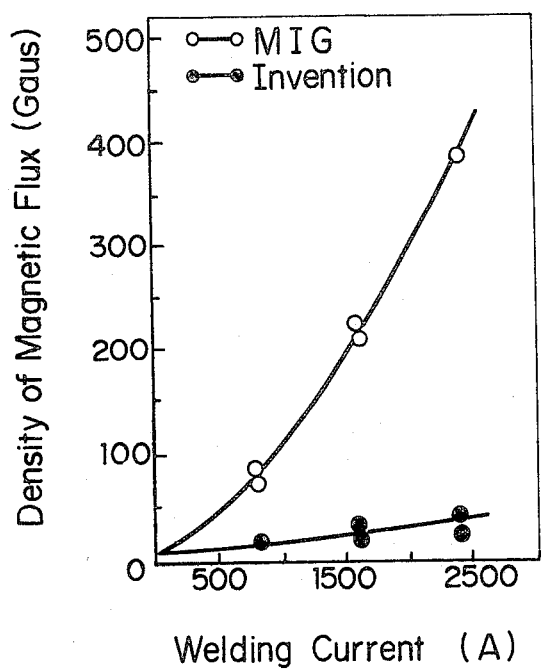
FIG_4
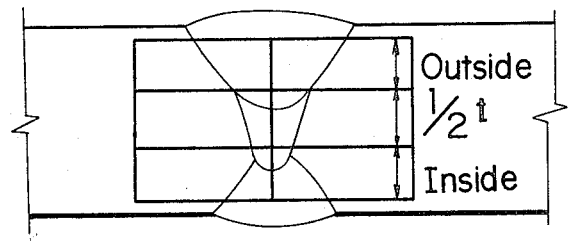
FIG_6
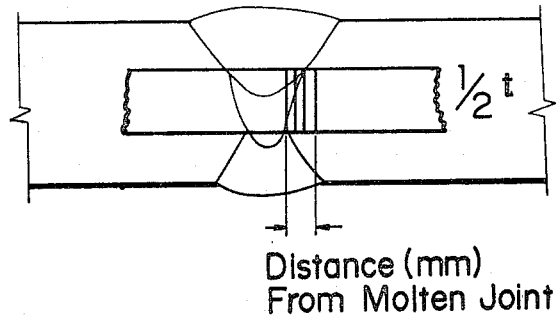
FIG_8

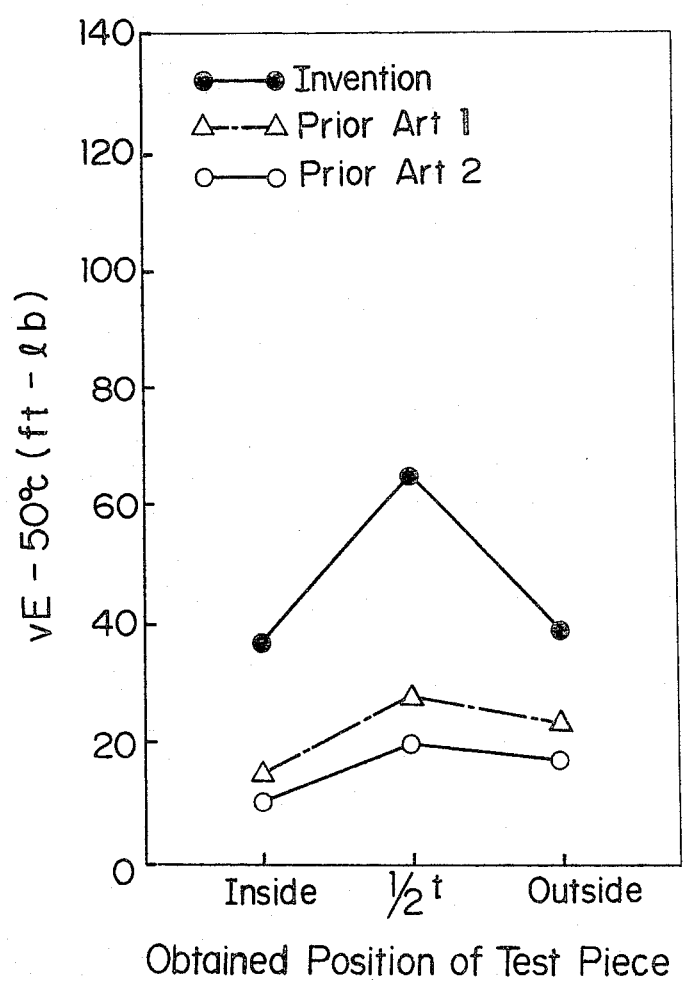
FIG_5

THICK WELDED STEEL PIPE OF LARGE DIAMETER AND PRODUCTION THEREOF

BACKGROUND OF THE INVENTION

The present invention relates to thick welded steel pipe of large diameter and production thereof, and more particularly to a seam-welding method therefor which is employed in producing steel pipes by UOE Process.

Production of steel pipe by the UOE Process as a method of producing thick welded steel pipe of large diameter is known. In such pipe making method, flat blankwork is progressively rounded to a U-shape and then to an O-shape having a single longitudinal seam. Multipole submerged arc welding using molten flux has been used on the inner and an outer surfaces of the seam to weld the pipe. In view of efficiency, this method is suitable to the process of the UOE steel pipe which has become thicker in cross section. However, due to the characteristics of the molten flux that viscosity and melting point become lower at high temperatures, as the cross section of the initial blankwork becomes thicker, the bead formation, of the seam deteriorates. Further, since the welding input heat becomes larger, toughness at the welded seam is deteriorated.

In these circumstances, there have been proposed certain seam-welding methods for use on thick blankwork of large diameter. One of them is as disclosed in Japanese Laid-Open application No. 130,241/78 wherein the O-shaped blankwork is welded on first layers of the inner and outer surfaces by an oscillation MIG welding method using small diameter wire with low welding current on narrow electrodes and the surface layer is finished by a submerged arc welding method. Another is as seen in Japanese Laid-Open application No. 130,242/78 wherein the material is prepared with the welding grooves having a root face of 3-8 mm at a center within ⅓ of the thickness. The grooves are symmetrical on the inner and outer sides thereof. The welding is carried out with the MIG welding up to 0.5-5.0 mm in depth of the welding grooves and performed on the final layer with a submerged arc welding method involving both the out wires and flux in the groove joint.

However, since both methods each apply, in combination, MIG welding and submerged arc welding on the inner and outer surfaces of the material, a magnetic blowing phenomenon occurs especially upon welding on the first layer and causes the bead formation thereon to be inferior. In order to avoid such occurrence, the welding facilities are restructured in a complicated manner including such changes as rearrangement of guide rollers, electrical wires and so on for providing a forward welding. Since the method of Japanese Laid-Open application No. 130,241/78 is by MIG welding with narrow wire, the efficiency is not preferable, and since the method of Japanese Laid-Open application No. 130,242 deals with submerged arc welding on the final layer as adding the steel piece, the welded metal is generated with segregation and the material is lowered in its properties.

The present invention has been devised to eliminate such problems involved in the conventional seam-welding methods for producing thick welded steel pipe of large diameter.

It is an object of the invention to provide thick welded steel pipe of large diameter having well conditioned micro-substructure and high toughness on the welded portions.

It is another object of the invention to reduce the cross sectional area of the welded seam on the inner surface in order to reduce the welding input heat and to avoid deterioration of the bead formation owing to the characteristics of the molten flux thus causing neither magnetic blowing at welding nor inconvenience thereby, so that pretty bead appearance and high toughness may be ensured.

It is a further object of the invention to carry out a padding on the edge of the larger cross sectional area at the outer surface by utilizing deep melting penetration and low input heat of the MIG welding by means of the combination of the MIG welding and the submerged arc welding, so that the outer surface of the seam is finished with a pretty bead appearance which is one of the merits of the submerged arc welding, to bring about the high toughness on the welded portions.

BRIEF DESCRIPTION OF THE DRAWINGS

FIG. 4 is a graph showing a comparison between the invention and the straight MIG welding, in density of the magnetic flux within the welding groove and the welding current, FIG. 5 is a graph showing a comparison between the invention and the conventional methods, in Charpy V-notch impact characteristics of the welded metal, FIG. 6 is an explanatory view showing an outline of a piece to be used in a Charpy-V-notch impact test, FIG. 8 is an explanatory view showing an outline of a piece to be used in a Charpy V-notch impact test to generate data as shown in FIG. 7.

DETAILED DESCRIPTION OF THE INVENTION

Figure 1A:
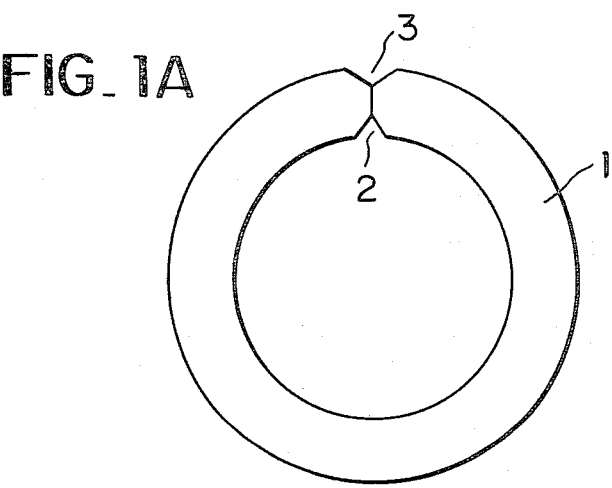
FIG. 1-a is an enlarged explanatory view of a part of thick blankwork of a large diameter formed into an O-shape and ready to be welded according to the invention, FIG. 1-b is an enlarged explanatory view of a welded portion of the thick welded steel pipe of the large diameter according to the invention, FIG. 2-a is an explanatory view showing welding taking place on the inner surface in accordance with the invention, FIG. 2-b is an explanatory view of the same on the outer surface.
Figure 1B:
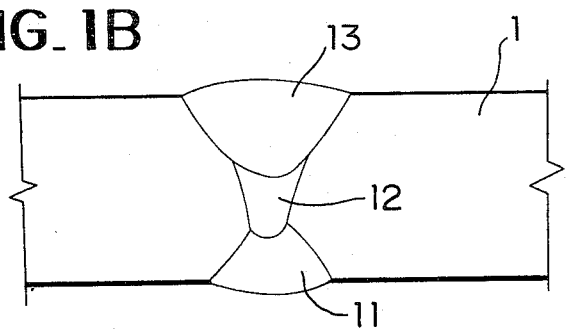

The welding method according to the invention is applied to a flat piece of blankwork of a certain thickness which has been formed progressively into a U-shape and then into an O-shape having a single longitudinal seam. The thickness of the piece in general is from about more than 32 mm to 50 mm. For seam-welding the blankwork on its inner and outer surfaces by one-run, the invention does not include preparing symmetrically sized welding grooves on the inner and outer surfaces as in the prior art, but instead as shown in FIG. 1-b, includes preparing welding grooves such that the cross sectional area of the inner groove 2 is smaller than that of the outer groove 3. The extent of smallness of the inner groove edge 2 with respect to the outer groove 3 is appropriately determined depending on the optimum input heat obtained by the thickness, the properties of the material, the number of the poles, the diameter of the wire and other conditions. Subsequently, one-run welding is carried out on such treated blankwork 1 on its inner and outer surfaces. At such time, the prior art performs the paddings at the both surfaces using the same welding method. On the other hand, the present invention welds thereon using different methods respectively. That is, with respect of the inner groove the material is welded as shown in FIG. 2-a from the innermost portion to the surface thereof by means of an AC multipole submerged arc welding machine using molten flux, while with respect to the outer groove, the material is formed thereon with the one-run welding such that the first layer is welded by large current MIG welding torch 4 and the second layer is welded by submerged arc torches 5b, 5b for the outer surface using molten flux. Thus, the inner outer portion is as shown in FIG. 1-b provided with the submerged arc welded layer 11 and the other edge is formed with the large current MIG welded layer 12 as the first layer and with the submerged arc welded layer 13 as the second layer.

Figure 3:
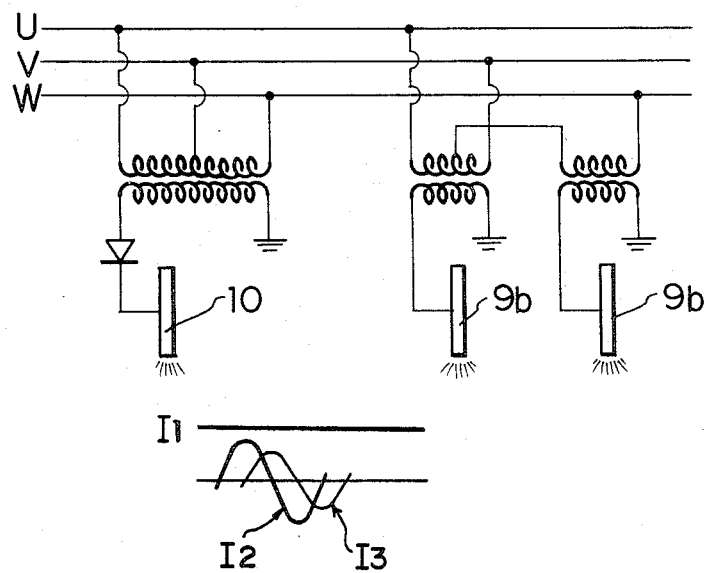
FIG. 3 is a circuit of a welding machine for the outer surface.

In FIGS. 2-a and 2-b, a reference numeral 5a is a submerged arc torch, 7a and 7b are nozzles for supplying flux, 8a and 8b are molten flux, 9a and 9b are wires for the submerged arc welding, 10 is a wire for the large diameter MIG welding. The large current MIG welding torch 4 has a double shielding mechanism comprising an inner shielding sleeve 41 and an outer shielding sleeve 42, after which an after-shielding part 43 is incorporated. A welding machine current is shown in FIG. 3 wherein a first pole for the large current MIG welding is connected with DC transformer to change power characteristic into direct current reverse polarity (DCRP) of a drooping characteristic, and the following second and third poles for the submerged arc welding are connected with an AC Scott "T circuit". In these connections, the larger current MIG welding torch 4 and the outer surface submerged arc torches 5b, 5b are set on one truck 6 for the one-run welding.

The large current MIG welding is in general practised under conditions of an atmosphere of shielding gas of 50–200 L/min of inert gas or inert gas containing $CO_2$ or $O_2$, a consuming electrode of 3.2–6.4 mm$\phi$, a welding current of 600–1500 Amp, an arc voltage of 23–36 V and a welding speed of 300–1500 mm/min.

Reference will be made to an embodiment of preparing asymmetrically the inner groove 2 to be smaller than the outer groove 3, padding the inner side of the material 1 by the submerged arc welding, carrying out the large current MIG welding on the first layer of the outer side and padding the second later of the same by the submerged arc welding. With respect to the outer surface, the padding can be also efficiently practised on the groove 3 by the large current MIG welding of the large amount of the deposition. Besides, since the large current MIG welding is combined with the submerged arc welding the amount of the total welding input heat is lowered and the amount of consumption of flux can be reduced compared with the case wherein multi-pole submerged arc welding is performed along the entire outer groove with the same input heat. Due to the lower heat to melt the flux with the high efficiency, the slag is never overheated, and accordingly in the molten flux the welded bead even on an ultra thick material (e.g. 50 mm) may be uniform. The low welding input heat brings about the excellent toughness on the welded metal and on the heat influenced parts.

When the first layer is formed with multi welded layers by the large current MIG welding of more than two poles, remarkably excellent toughness may be provided in the center in thickness of the material.

With respect to the inner surface, when the MIG welding is operated thereon or the padding by the MIG welding is done on the first layer thereof, and since the MIG welding ordinarily uses DC power a magnetic field is formed by the welding current passing in the cable along a central axis of the pipe. That is, a magnetic field is formed around the welding torch in circumference of the pipe. The blankwork 1 is effected with strong magnetization in the same direction. If the arc is placed within such a magnetic field, the arc is biassed toward the welding wire and so-called magnetic blowing phenomenon is caused. The present invention uses AC submerged arc welding method on the inner side, preventing a magnetic blowing phenomenon and inferior bead formation thereby.

FIG. 4 shows relationship between the density of the magnetic flux and the welding current within the inner welding groove of the blankwork of 48 mm in outer diameter and 32 mm in thickness. As is seen from FIG. 4 the proposed method is more advantageous than the MIG welding or a method incorporating the MIG welding. The invention does not only weld the inner side with AC submerged arc but welds it in such a condition that the groove 2 of the inner side is made smaller than that of the outer side. From this fact, the necessary depositing amount is reduced and the welding input heat may be made lower as much in comparison with the submerged arc welding on the symmetrical edges of the same cross sectional area in the inner and outer sides. Therefore, the well conditioned bead formation and toughness on the welded part can be ensured with solving the problems involved in the prior art in the characteristics at high temperatures of the molten flux and the welding input heat.

Examples according to the invention will be shown under:

EXAMPLE 1

Three kinds of the thick blankworks of the large diameter (Thick.: 32 mm, 38 mm, 50 mm) passed through the U- and O-formings to form an O-shape having a single longitudinal seam were each processed asymmetrically in the welding grooves such that the inner groove was made smaller than the outer groove. The inner groove was welded by the submerged arc of 2 poles using the molten flux, and the outer groove was welded with the large current MIG on the first layer and with the submerged arc of 2 poles on the second layer. Table 1 shows the thickness of the blankworks tried in Example 1 and the chemical composition, and Table 2 shows the welding conditions of each of the kinds. The wires in Table 2 were Ni-Mo-Ti steel, and the distance between the first and second wires on the outer side was 380 mm.

TABLE 1

| Steel No. | Thick. (mm) | Grade | C | Si | Mn | P | S |
|---|---|---|---|---|---|---|---|
| 1 | 32 | HS 80 | 0.101 | 0.24 | 0.79 | 0.019 | 0.006 |
| 2 | 38 | APIX 52 | 0.11 | 0.33 | 1.53 | 0.014 | 0.003 |
| 3 | 50 | APIX 52 | 0.10 | 0.34 | 1.54 | 0.016 | 0.003 |

TABLE 1-continued

| No. | Cu | Ni | Cr | Mo | Nb | V | B | So.Al (%) |
|---|---|---|---|---|---|---|---|---|
| 1 | 0.18 | 0.86 | 0.475 | 0.45 | — | 0.052 | 0.0012 | 0.055 |
| 2 | — | — | — | 0.22 | 0.036 | — | — | 0.037 |
| 3 | — | — | — | 0.21 | 0.035 | — | — | 0.030 | one welded layer was formed by the submerged arc of 3 poles on the symmetrical grooves of the inner and outer sides. The test piece (10×10 mm) was obtained as shown in FIG. 6. As is seen from FIG. 5, the present invention is excellent in toughness at−50° C. (vE-50° C.) at the inner and outer side in comparison with the prior art. The ordinate shows the energy absorbed (vE) by the impact of the Charpy test pendulum against the sample (in foot-pounds).

TABLE 2

| Steel No. | Welding Edges | Elctr. No. | Inner Side 2 SAW mmφ | A | V | mm/min | Outer Side MIG + 2 SAW mmφ | A | V | mm/min | MIG Gas Conditions | |
|---|---|---|---|---|---|---|---|---|---|---|---|---|
| 1 | Inner side [diagram: 32, 8, 8, 16, 35°, 30°] Outer side | 1 | 4.0 | 950 | 34 | 700 | 4.0 | 870 | 30 | | No. 1: MIG | Ar 40L/min |
| | | 2 | 4.0 | 800 | 40 | | 4.0 | 1000 | 35 | 500 | Inner Gas | CO₂ 40L/min |
| | | 3 | | | | | 4.0 | 850 | 41 | | Outer Gas | Ar 50L/min |
| | | | | | | | | | | | After-shielding | Ar 50L/min |
| 2 | Inner side [diagram: 38, 10, 9, 19, 35°, 27°] Outer side | 1 | 4.8 | 1050 | 36 | 600 | 4.8 | 950 | 29 | | No.1: MIG | Ar 40L/min |
| | | 2 | 4.8 | 850 | 40 | | 4.8 | 1000 | 35 | 400 | Inner Gas | CO₂ 40L/min |
| | | 3 | | | | | 4.8 | 850 | 41 | | Outer Gas | Ar 50L/min |
| | | | | | | | | | | | After-shielding | Ar 50L/min |
| 3 | Inner side [diagram: 50, 13, 11, 26, 30°, 25°] Outer side | 1 | 4.8 | 1300 | 38 | 500 | 4.8 | 950 | 29 | | No. 1: MIG | Ar 40L/min |
| | | 2 | 4.8 | 1150 | 400 | | 4.8 | 1200 | 35 | 300 | Inner Gas | CO₂ 40L/min |
| | | | | | | | 4.8 | 950 | 41 | | Outer Gas | Ar 50L/min |
| | | | | | | | | | | | After-shielding | Ar 50L/min | mmφ: Wire diameter
A: Electric current
V: Voltage
mm/min: Welding speed
SAW: Submerged Arc Welding

EXAMPLE 2

With respect to the steel No. 1 in the above conditions, standard Charpy V-notch impact tests were carried out. FIG. 5 shows the comparison results between the base (the conventional method 1) that the multi welded layers were formed by the submerged arc of 2 poles on the symmetrical grooves of the inner and outer sides and the case (the conventional method 2) that the

EXAMPLE 3

Figure 7:
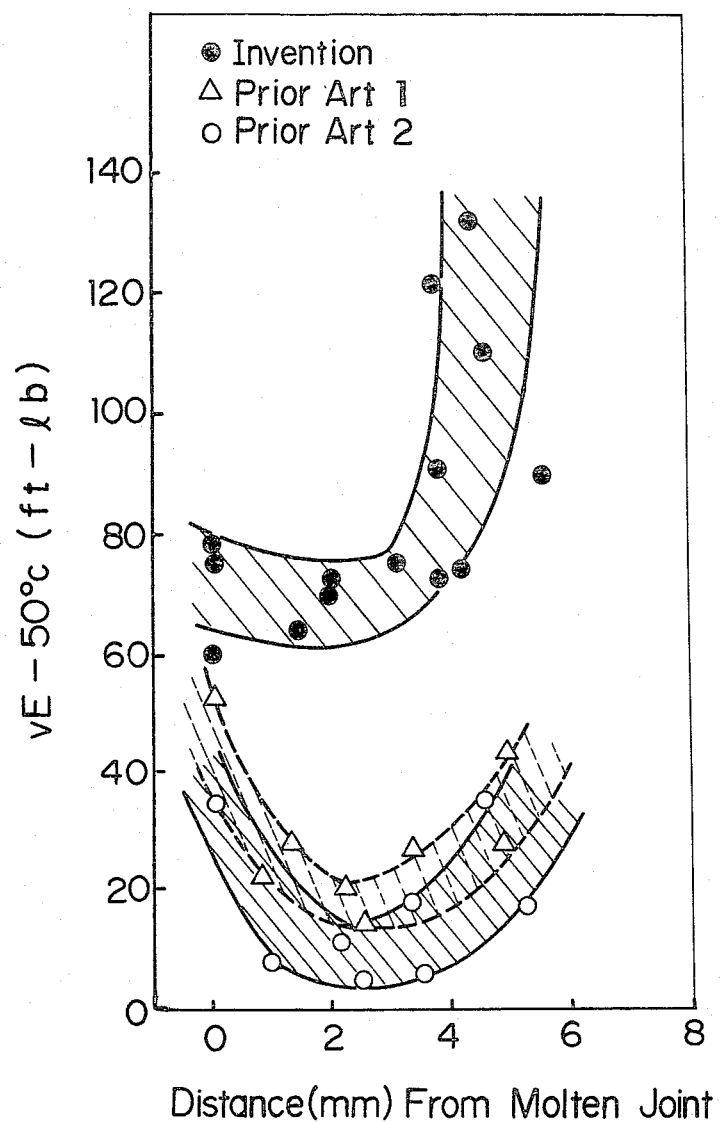
FIG. 7 is a graph showing a comparison between the invention and the conventional methods, in Charpy V-notch impact characteristics at the welding heat influenced part.

With respect to the steel No. 1, further standard Charpy V-notch impact tests were carried out on the welding heat influences parts, and the results are shown in FIG. 7. FIG. 8 shows the position from which the test piece was obtained. As is seen from FIG. 7, the present invention imparts the high toughness to the welding heat influenced part in comparison with the prior art.

With respect to the steels No. 2 and No. 3, Charpy V-notch impact tests were also carried out, and high toughness was recognized in the welded metal and the welding heat influenced part and the pretty bead appearance was provided in comparison with the prior art.

As mentioned hereinbefore, the present invention employs, in combination, the large current MIG suited to the welding at the innermost part of the welding groove which requires the deep penetration and the submerged arc suited to the welding at the surface of the groove which requires the pretty bead appearance, so that the excellent properties can be obtained in the micro-substructure and the toughness of the welded part on the outer side, and the magnetic blowing and the inferior bead formation can be surely avoided on the inner side. Further, the welding input heat is appropriately lowered to solve the problems in using the molten flux and prevent the inferiority in the toughness, and the inner side may be formed with the well conditioned bead formation and the welded part of the high toughness. Accordingly the present invention is superior in welding the thick welded steel pipe of the large diameter which has become thicker in cross section.

We claim:

1. A method of producing thick steel pipe of large diameter comprising successively forming a flat blankwork having edges into a U-shape and thereafter into an O-shape having a single longitudinal seam to be welded; asymmetrically preparing the edges of the blankwork to form on the O-shape an inner welding groove and an outer welding groove along the seam, said inner welding groove being smaller than said outer welding groove; forming a submerged arc welded layer by an AC multi-pole SAW machine in said inner groove entirely from an innermost portion to a surface thereof; and forming a first welded layer in said outer groove by large current MIG welding and a second layer by submerged arc welding.

2. A method as claimed in claim 1, wherein the first layer in the outer groove is welded by multi-pole large current MIG.

3. A method as claimed in claim 1, wherein the outer groove is welded in that a pole for the large current MIG welding is connected with DC tranformer and a following pole for the submerged arc welding is connected with an AC Scott "T circuit", and the large current MIG welding torch and the submerged arc welding pole are set on one truck for performing a one-run welding.

4. A method as claimed in claim 3, wherein the welding is carried out in a plurality of poles of the submerged arc.

5. Thick wall steel pipe of large diameter produced by: successively forming a flat blankwork having edges into a U-shape and thereafter an O-shape having a single longitudinal seam to be welded, asymmetrically preparing the edges of the blankwork to form on the O-shape an inner welding groove and an outer welding groove along the seam, said inner welding groove being smaller than said outer welding groove, forming a submerged arc welded layer by an AC multi-pole SAW machine in said inner groove entirely from an innermost portion to a surface thereof, and forming a first welded layer in said outer groove by large current MIG welding and a second welded layer by submerged arc welding.

* * * * *